(12) United States Patent
Oh et al.

(10) Patent No.: US 8,929,824 B2
(45) Date of Patent: Jan. 6, 2015

(54) APPARATUS AND METHOD FOR EXCHANGING INFORMATION ON DEVICE IN COMMUNICATION BETWEEN DEVICES

(71) Applicant: Samsung Electronics Co., Ltd, Gyeonggi-do (KR)

(72) Inventors: Youn-Jo Oh, Seoul (KR); Hee-Jeong Lee, Hyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 53 days.

(21) Appl. No.: 13/752,311

(22) Filed: Jan. 28, 2013

(65) Prior Publication Data

US 2013/0196646 A1    Aug. 1, 2013

(30) Foreign Application Priority Data

Jan. 26, 2012    (KR) .......................... 10-2012-0007675

(51) Int. Cl.
*H04B 7/00*    (2006.01)
*H04W 4/00*    (2009.01)

(52) U.S. Cl.
CPC .................................... *H04W 4/001* (2013.01)
USPC ................... 455/41.2; 455/575.9; 455/569.2; 455/420; 455/3.04

(58) Field of Classification Search
USPC ........................ 455/411, 414.1, 39, 418, 41.2, 455/41.1–41.3, 569.2, 575.1–575.9, 550.1, 455/556.1–556.2, 90.1–90.3; 370/338
See application file for complete search history.

(56) References Cited

U.S. PATENT DOCUMENTS

| | | | |
|---|---|---|---|
| 7,343,174 B2 * | 3/2008 | Suryanarayana et al. . | 455/553.1 |
| 7,813,698 B2 * | 10/2010 | Seshadri et al. ............. | 455/41.2 |
| 8,175,517 B2 * | 5/2012 | Tabaaloute ................... | 455/3.04 |
| 8,180,337 B2 * | 5/2012 | Veliu et al. .................... | 455/420 |
| 8,494,439 B2 * | 7/2013 | Faenger ....................... | 455/3.06 |
| 8,594,654 B2 * | 11/2013 | Weyl et al. .................... | 455/420 |
| 8,626,829 B2 * | 1/2014 | Franco et al. ................ | 709/203 |
| 8,655,275 B2 * | 2/2014 | Nocera ........................ | 455/41.2 |
| 2002/0160761 A1 * | 10/2002 | Wolfe ........................... | 455/414 |
| 2008/0068519 A1 * | 3/2008 | Adler et al. ................... | 348/838 |
| 2008/0174414 A1 * | 7/2008 | McCarthy et al. .......... | 340/425.5 |
| 2009/0005136 A1 * | 1/2009 | Hutzel et al. ............... | 455/575.9 |
| 2011/0009098 A1 | 1/2011 | Kong | |
| 2011/0022768 A1 | 1/2011 | Ulenas | |
| 2011/0225260 A1 | 9/2011 | Kalhous et al. | |
| 2011/0264466 A1 * | 10/2011 | Green et al. ...................... | 705/3 |
| 2011/0265158 A1 | 10/2011 | Cha et al. | |
| 2011/0280233 A1 | 11/2011 | Choi et al. | |

(Continued)

OTHER PUBLICATIONS

International Search Report dated Apr. 24, 2013 in connection with International Patent Application No. PCT/KR2013/000162, 3 pages.

(Continued)

*Primary Examiner* — Sharad Rampuria

(57) ABSTRACT

To provide information of a device in communication between devices, an operating method of a device includes including device information of the device in a message defined by a communication protocol used to connect to the other device; and transmitting the message comprising the device information using the communication protocol. The device information comprises at least one of a device type, support of a mirror link, mobile communication network connection support, automatic execution of an application corresponding to the device, vendor identification information, and product identification information.

20 Claims, 8 Drawing Sheets

(56) References Cited

U.S. PATENT DOCUMENTS

| 2011/0294466 | A1  | 12/2011 | Tang et al. |
| 2013/0045677 | A1* | 2/2013  | Chien ............................ 455/39 |
| 2013/0055096 | A1* | 2/2013  | Kim et al. .................... 715/738 |
| 2013/0109314 | A1* | 5/2013  | Kneckt et al. ................ 455/41.2 |
| 2014/0106726 | A1* | 4/2014  | Crosbie et al. ............... 455/418 |

OTHER PUBLICATIONS

Written Opinion of the International Searching Authority dated Apr. 24, 2013 in connection with International Patent Application No. PCT/KR2013/000162, 5 pages.

* cited by examiner

APPARATUS AND METHOD FOR EXCHANGING INFORMATION ON DEVICE IN COMMUNICATION BETWEEN DEVICES

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jan. 26, 2012 and assigned Serial No. 10-2012-0007675, the entire disclosure of which is hereby incorporated by reference.

TECHNICAL FIELD OF THE INVENTION

The present disclosure relates generally to communication between devices.

BACKGROUND OF THE INVENTION

A vehicle is furnished with additional equipments such as car audio and navigator for the sake of driver's convenience. In general, the additional equipments are attached to a dash board in front of a driver's seat. The equipments including the audio and the navigator can be referred to as a Head Unit (H/U).

When vehicular equipments are digitized and mobile devices such as mobile phone and smart phone are widely used, services for interworking between the H/U and the mobile devices are developed. Thus, the H/U can expand and provide an application or a service offered by the mobile device as its function. For example, a navigation application or a service screen of the mobile device can be displayed the same in the H/U display device, and the mobile device can be controlled inside the H/U device.

Connection between the H/U sand the mobile device can be configured using a wireless Local Area Network (LAN) (e.g., Wireless Fidelity (WiFi)) or a Universal Serial Bus (USB). When the mobile device accesses the H/U using, the wireless LAN or the USB, it is requested to operate differently from typical WiFi connection and USB connection. That is, even when the wireless LAN connection is configured with the H/U, the mobile device needs to maintain a data path for a mobile communication network according to characteristics of the H/U. Also, the mobile device, which is connected to the H/U, needs to execute the application for interworking with the H/U or determine whether to execute such an application.

The above-discussed problem can occur to every device capable of mutually communicating using the wireless LAN or the USB as well as the H/U and the mobile device. For example, home appliances such as camera, television (TV), and refrigerator having the communication capability can have such a problem.

SUMMARY OF THE INVENTION

To address the above-discussed deficiencies of the prior art, it is a primary aspect of the present disclosure to provide an apparatus and a method for providing characteristic information of a device in communication between devices.

Another aspect of the present disclosure is to provide an apparatus and a method for providing characteristic information of a device using a communication protocol in communication between devices.

According to one aspect of the present disclosure, an operating method of a device for communicating with other device includes including device information of the device in a message defined by a communication protocol used to connect to the other device; and transmitting the message comprising the device information using the communication protocol. The device information comprises at least one of a device type, support of a mirror link, mobile communication network connection support, automatic execution of an application corresponding to the device, vendor identification information, and product identification information.

According to another aspect of the present disclosure, an operating method of a device for communicating with other device includes obtaining device information of the other device from a message defined by a communication protocol used to connect to the other device; and performing an operation as indicated by the device information. The device information comprises at least one of a device type, support of a mirror link, mobile communication network connection support, automatic execution of an application corresponding to the device, vendor identification information, and product identification information.

According to yet another aspect of the present disclosure, an apparatus for communicating with other device includes a controller for including device information of the device in a message defined by a communication protocol used to connect to the other device; and a communication unit for transmitting the message comprising the device information using the communication protocol. The device information comprises at least one of a device type, support of a mirror link, mobile communication network connection support, automatic execution of an application corresponding to the device, vendor identification information, and product identification information.

According to still another aspect of the present disclosure, an apparatus for communicating with other device includes a communication unit for receiving a message defined by a communication protocol used to connect to the other device; and a controller for obtaining device information of the other device from the message and performing an operation as indicated by the device information. The device information comprises at least one of a device type, support of a mirror link, mobile communication network connection support, automatic execution of an application corresponding to the device, vendor identification information, and product identification information.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Exemplary embodiments of the present disclosure provide a technique for providing characteristic information of a device in communication between the devices. Hereinafter, communication between a mobile device and a vehicle head unit is explained by way of example. Yet, the present disclosure is not limited to the communication between the mobile device and the head unit and is applicable to communication between other devices. For example, the other devices can include home appliances such as refrigerator, television (TV), and camera. Herein, the communication between the devices can be referred to as Machine to Machine (M2M) communication.

Figure 1A:
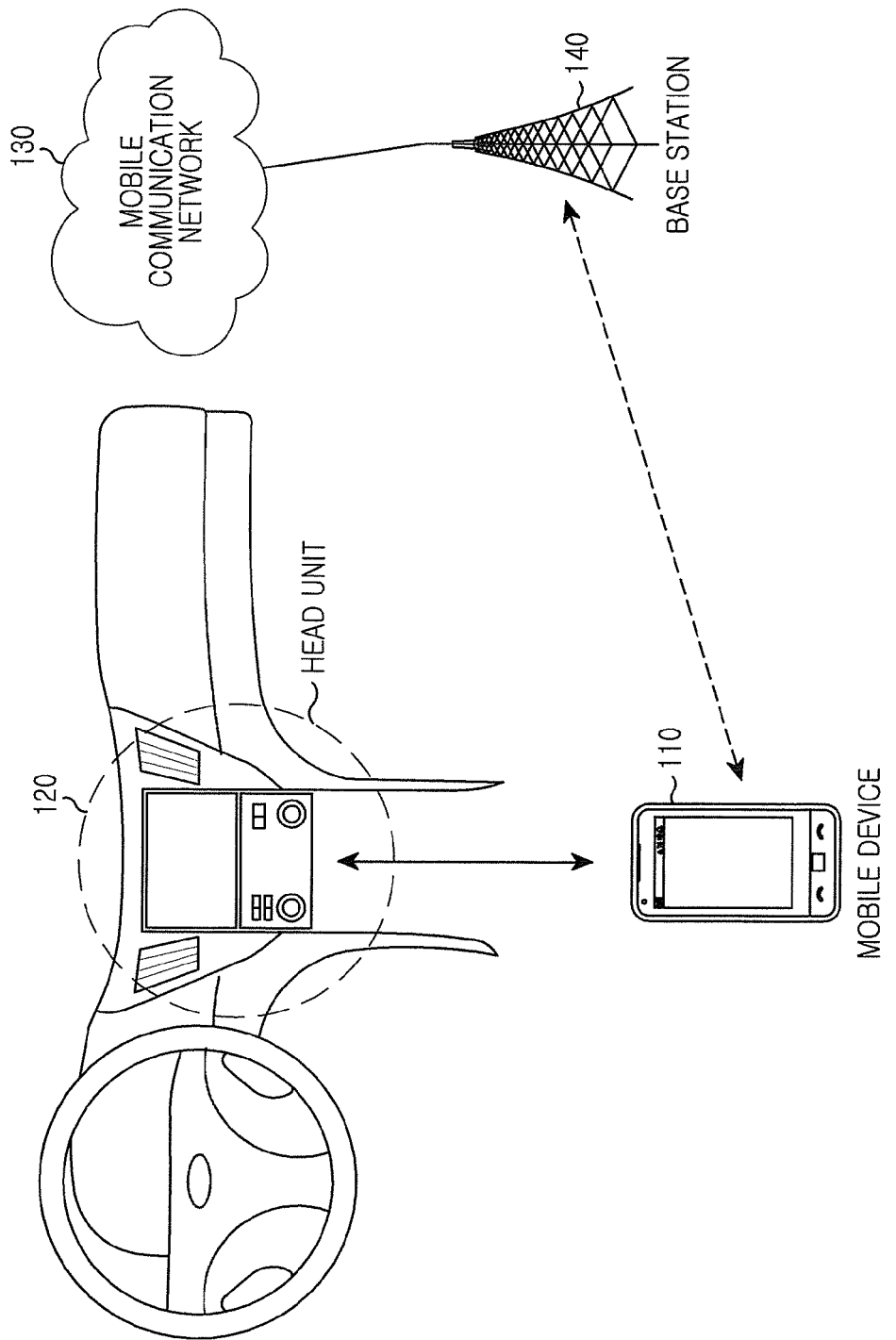
FIGS. 1A and 1B illustrate communication environments between devices according to an exemplary embodiment of the present disclosure.
Figure 1B:
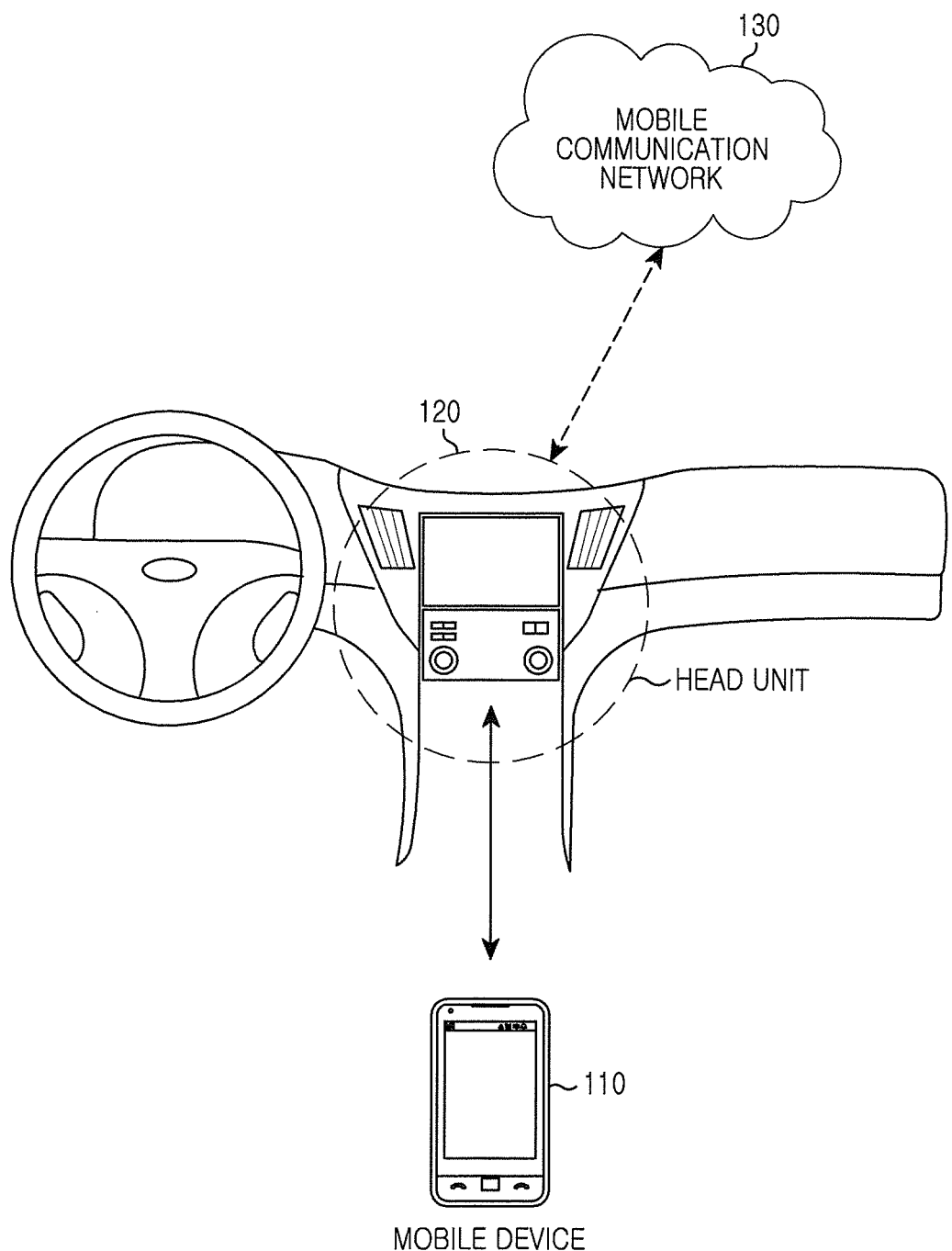

FIGS. 1A and 1B illustrate communication environments between devices according to an exemplary embodiment of the present disclosure. FIGS. 1A and 1B depict communication environments between a mobile device 110 and a head unit 120 of the vehicle.

The mobile device 110 and the head unit 120 can configure their connection using a wireless Local Area Network (LAN), a Universal Serial Bus (USB), or Bluetooth based on a mirror link standard. Typically, when the connection of the wireless LAN is configured, the mobile device 110 sets a data path through the wireless LAN connection, rather than a mobile communication network.

However, in the connection of the mirror link, since the wireless LAN connection is used as a protocol path agreed between the mobile device 110 and the head unit 120, rather than the data path, as shown in FIG. 1A, it is advantageous that the mobile device 110 maintain the existing data path based on the connection to the mobile communication network 130 via a base station 140. More specifically, when the user boards the vehicle with the mobile device 110, the mobile device 110 can maintain the connection to the mobile communication network and display a function executed by the mobile device 110 through the navigation or a display means of the vehicle. In so doing, the mobile device 110 discovers an Access Point (AP) or a communication module for communicating with the vehicle. The communication module of the vehicle can be the wireless LAN, the Bluetooth, or the USB, and the supported function can vary according to a required transfer rate and a data amount. Hence, to support the function, when the mobile devices 110 lies in the vehicle, the mobile device 110 needs to discover the communication module of the head unit 120, configure the connection, and simultaneously maintain the connection to the mobile communication network 130 for voice call.

However, the head unit 120 can include an interface for connecting to the mobile communication network 130. In other words, when the communication module of the vehicle supports the communication with the mobile communication network 130; that is, when the vehicle is equipped with an antenna and Radio Frequency (RF) and connectable to the mobile communication network 130 as shown in FIG. 1B, the mobile device 110 may not keep the connection to the mobile communication network 130 via the base station 140. In this example, according to an exemplary embodiment, the mobile device 110 can provide only the simple input or selection function, and the function for connecting to the mobile communication network 130 can be executed by the head unit 120. At this time, the mobile device 110 operates merely as the simple input means and the head unit 120 accesses the mobile communication network 130. According to another exemplary embodiment, the mobile device 110 can access the mobile communication network 130 through the head unit 120. In this example, the mobile device 110 accesses the mobile communication network 130, and then can serve as one user terminal, rather than the simple input means. That is, the head unit 120 can replace the base station.

FIG. 1B depicts the head unit 120 which is connectable to the mobile communication network 130. Alternatively, the head unit 120 can be connected directly to a data core network. Similarly, the mobile device 110 can serve as the simple input means or access the data core network through the head unit 120.

Figure 2:
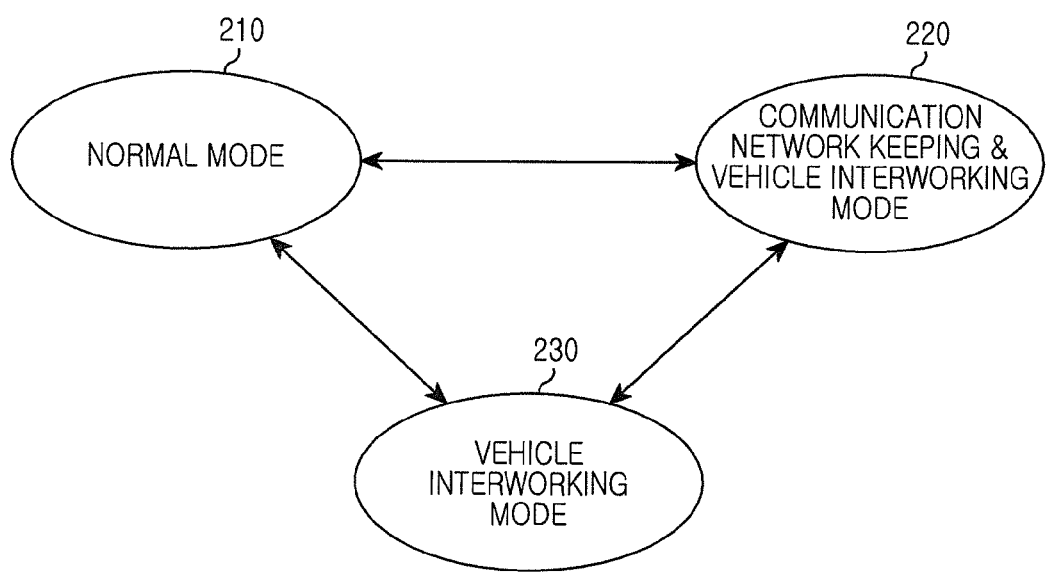
FIG. 2 illustrates an operation mode of a mobile device according to an exemplary embodiment of the present disclosure.

According to the environments of FIGS. 1A and 1B, the operation mode of the mobile device can change as shown in FIG. 2. FIG. 2 depicts operation modes of the mobile device according to an exemplary embodiment of the present disclosure.

Referring to FIG. 2, the mobile device can operate in a normal mode 210, a communication network keeping & vehicle interworking mode 220, and a vehicle interworking mode 230. The normal mode 210 access the mobile communication network without the connection of the head unit. The communication network keeping & vehicle interworking mode 220 configures the connection to the head unit while maintaining the connection with the mobile communication network. The vehicle interworking mode 230 terminates the connection to the mobile communication network and configures the connection to the head unit.

In the normal mode 210, when the mobile device accesses the head unit of the vehicle, the mobile device can transit to the communication network keeping & vehicle interworking mode 220 or the vehicle interworking mode 230 according to a capability of the head unit. For example, when the head unit does not support the connection to the mobile communication network, the mobile device sets the connection to the head unit and keeps the existing connection to the mobile communication network; that is, operates in the communication network keeping & vehicle interworking mode 220. That is, the mobile device maintains the connection to the head unit and the connection to the mobile communication network independently. By contrast, when the head unit supports the connection to the current mobile communication network, the mobile device can be used as the simple input means by operating in the vehicle interworking mode 230, or can access the mobile communication network through the head unit.

As stated above, when the mobile device sets the connection to the head unit of the vehicle, whether to keep the connection to the mobile communication network can depend on whether the head unit includes the interface with the mobile communication network. For doing so, it is necessary for the head unit to inform the mobile device of whether the interface to the mobile communication network is equipped.

Hence, device information exchanges in the wireless LAN environment and the USB environment are now elucidated.

Figure 3:
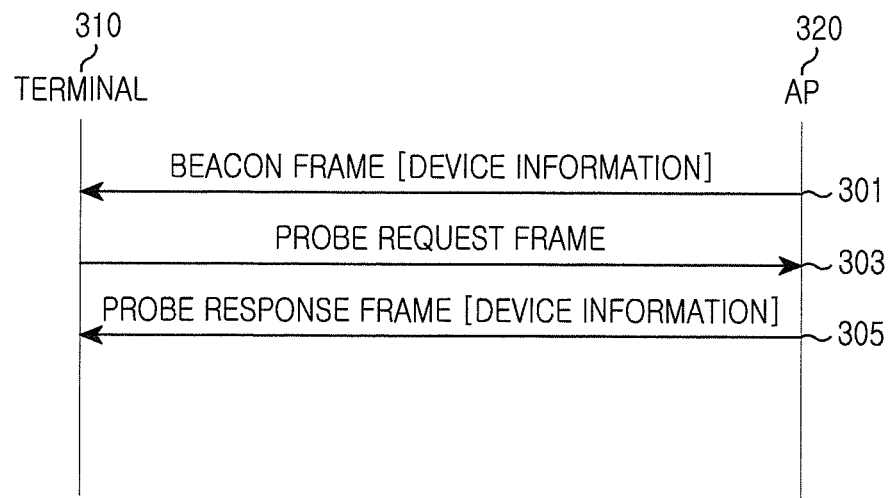
FIG. 3 illustrates device information exchange using, a wireless LAN according to an exemplary embodiment of the present disclosure.

FIG. 3 illustrates device information exchange using the wireless LAN according to an exemplary embodiment of the present disclosure. FIG. 3 depicts the device information exchange between a terminal 310 and an AP 320 in conformity with the wireless LAN standard. Referring back to FIGS. 1A and 1B, the terminal 310 corresponds to the mobile device 110 and the AP 320 corresponds to the head unit 120.

Referring to FIG. 3, in step 301, the AP 320 transmits a beacon frame including the device information. The AP 320 informs of its presence by periodically transmitting the beacon frame. The beacon frame includes information for identifying the AP 320. The beacon frame can include fields of time stamp, beacon interval, capability information, Service Set Identifier (SSID), and supported rate. At least one of the fields of the beacon frame includes the device information of the AP 320. For example, the device information can include at least one of device type (e.g., wireless LAN AP, head unit, camera, refrigerator, TV, etc.), support of the mirror link, mobile communication network connection support, automatic execution of a particular application, vendor identification information, and product identification information. For example, the device information can be included in the SSID. For example, the device information can be defined as a plurality of profiles and the AP 320 can inform of its profiles using its Media Access Control (MAC) address. The MAC addresses are divided into a plurality of ranges and each range corresponds to one profile.

In step 303, the terminal 310 receiving the beacon frame through passive scanning transmits a probe request frame. The probe request frame is a message requesting information of the AP 320 and can include the fields of the SSID of the AP 320 and the supported rate.

As receiving the probe request frame, the AP 320 transmits a probe response frame in step 305. The probe response frame can include the same information as the beacon frame. At least one of the fields of the probe response frame includes the device information of the AP 320. For example, the device information can include at least one of the device type (e.g., wireless LAN AP, head unit, camera, refrigerator, TV, etc.), the support of the mirror link, the mobile communication network connection support, the automatic execution of a particular application, the vendor identification information, and the product identification information. For example, the device information can be included in the SSID. For example, the device information can be defined as a plurality of profiles and the AP 320 can inform of its profiles using its MAC address. The MAC addresses are divided into the plurality of the ranges and each range corresponds to one profile.

Figure 4:
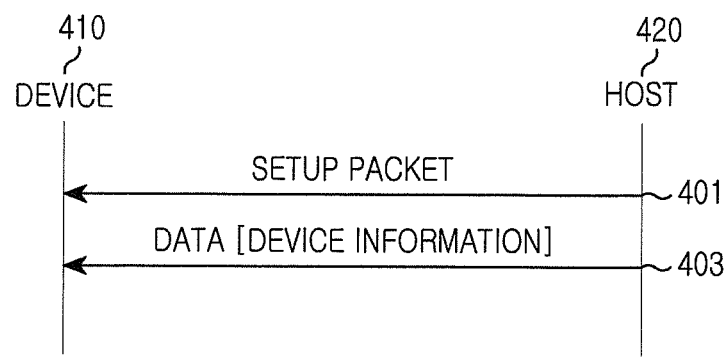
FIG. 4 illustrates the device information exchange using a USB according, to an exemplary embodiment of the present disclosure.

FIG. 4 illustrates the device information exchange using the USB according to an exemplary embodiment of the present disclosure. FIG. 4 depicts the device information exchange between a device 410 and a host 420 according to the USB standard. Referring back to FIGS. 1A and 1B, the device 410 corresponds to the mobile device 110 and the host 420 corresponds to the head unit 120.

For the USB connection and communication, the host 420 sends a request of a particular purpose to the device 410. The device 410 operates in response to the request and then sends a response. In so doing, the request and parameters for the request are transmitted in the form of a setup packet. The setup packet includes a request type field indicating characteristics of the request, a purpose field for specifying contents of the request, and at least one field subordinate to the contents of the request. The request type field can be referred to as 'bmRequestType', the purpose field can be referred to as 'mRequest', and the at least one field subordinate to the contents of the request can include 'wValue' and 'wIndex'. Data relating to the setup packet can be transmitted after the setup packet. In this example, the setup packet includes information of the data. More specifically, the request type field includes a bit indicating the direction of the data. When the device information is provided, the direction indicates the direction of the provided device information; that is, the direction from the host 420 to the device 410. The setup packet includes a length field indicating the size of the data.

Referring now to FIG. 4, in step 401, the host 420 transmits the setup packet to the device 410. In so doing, according to an exemplary embodiment, the setup packet includes the information of the data relating to the setup packet. That is, the setup packet includes the information such as transmission direction and size of the data. The data includes the device information of the host 420. Accordingly, the purpose field of the setup packet can be set to a specific value (e.g., 0xF0) indicating the device information provision. When the host 420 supports the mirror link, the field 'wValue' of the setup packet can be set to a value indicating a version of the supported mirror link.

In step 403, the host 420 transmits the data relating to the setup packet. Herein, the data includes the device information of the host 420. For example, the device information can include the device type (e.g., wireless AP, head unit, camera, refrigerator, TV, etc.), the support of the mirror link, the mobile communication network connection support, the automatic execution of a particular application, the vendor identification information, and the product identification information. For example, the first bit of the data field can indicate whether the mirror link is supported.

In the above-stated exemplary embodiments, it is necessary to provide the device information in order to inform of whether the mobile communication network is connected. However, the above exemplary embodiments can be realized to provide not only the connection or the disconnection of the mobile communication network but also the device information of other item. That is, the present disclosure can be realized to provide the device information of other item besides informing of whether the mobile communication network is connected.

The device information can include at least one of the device type (e.g., wireless LAN AP, head unit, camera, refrigerator, TV, etc.), the support of the mirror link, the mobile communication network connection support, the automatic execution of a particular application, the vendor identification information, and the product identification information. The device type, the vendor identification information, and the product identification information can be used to determine an application to execute after the connection between the devices is set. The available function differs according to the device type, and the capability of the corresponding device differs according to the vendor and the product. As the automatic execution of the application is informed, the device receiving the other device information can determine whether to automatically execute the application corresponding to the other device or to wait for a user's command.

Now, operations and structures of the devices for exchanging the device information as above are explained in detail by referring to the drawings.

Figure 5:
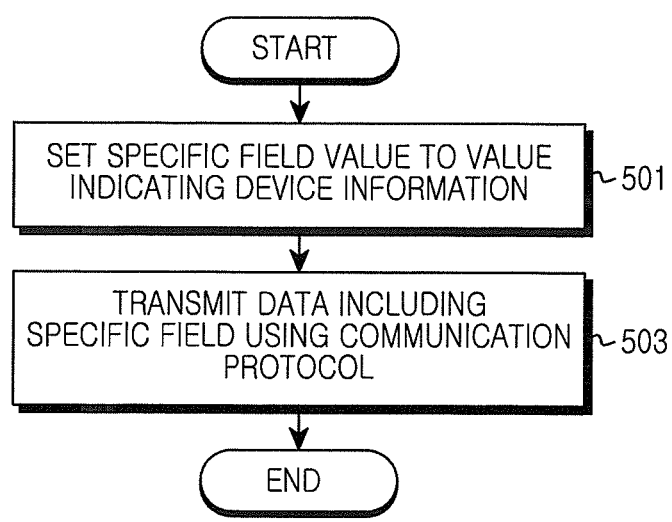
FIG. 5 illustrates a method for transmitting device information in communication between devices according to an exemplary embodiment of the present disclosure.

FIG. 5 illustrates a method for transmitting the device information in the communication between the devices according to an exemplary embodiment of the present disclosure.

Referring to FIG. 5, the device sets at least one specific field value to the value indicating the device information in step 501. For example, the device information can include at least one of the device type (e.g., wireless LAN AP, head unit, camera, refrigerator, TV, etc.), the support of the mirror link, the mobile communication network connection support, the automatic execution of a particular application, the vendor identification information, and the product identification information. The specific field can be the SSID field of the beacon frame or the probe response frame of the wireless LAN. The specific field can be the data relating to the setup packet of the USB. When the specific field is the data field of the setup packet, the purpose field of the setup packet can be set to the value indicating the device information provision.

In step 503, the device transmits the data including the specific field according to the communication protocol used to connect to the other device. For example, the communication protocol can be one of the wireless LAN, the USB, and the Bluetooth. When the wireless LAN is used to connect to the other device, the device transmits the beacon frame or the probe response frame including the device information. When transmitting the probe response frame, the device can receive the probe request frame from the other device before transmitting the probe response frame. When the USB is used to connect to the other device, the device transmits the setup packet indicating the device information provision and then transmits the data including the device information. For example, the device can be the head unit of the vehicle, and the other device can be the mobile device.

Figure 6:
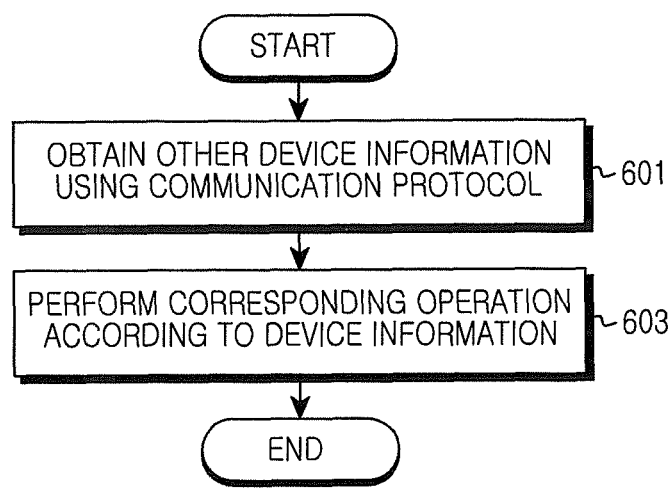
FIG. 6 illustrates a method for receiving the device information in the communication between the devices according to an exemplary embodiment of the present disclosure.

FIG. 6 illustrates a method for receiving the device information in the communication between the devices according to an exemplary embodiment of the present disclosure.

Referring to FIG. 6, in step 601, the device obtains the device information of the other device using the communication protocol used to connect to the other device. That is, the device obtains the device information of the other device using the message, the data, the frame, and the packet defined in the communication protocol. For example, the communication protocol can be one of the wireless LAN, the USB, the Bluetooth. When the wireless LAN is used to connect to the other device, the device receives the beacon frame or the probe response frame including the device information. When receiving, the probe response frame, the device can transmit the probe request frame to the other device before receiving the probe response frame. When the USB is used to connect to the other device, the device receives the setup packet indicating the device information provision and then receives the data including the device information.

In step 603, the device performs the corresponding operation according to the device information. For example, the device information can include at least one of the device type (e.g., wireless LAN AP, head unit, camera, refrigerator, TV, etc.), the support of the mirror link, the mobile communication network connection support, the automatic execution of a particular application, the vendor identification information, and the product identification information. For example, the device identifies the type of the other device based on the device information. The device determines the application to execute based on the device type, the vendor identification information, and the product identification information. The device determines whether to automatically execute the application corresponding to the other device or to wait for the user's command, depending on whether the application is automatically executed. When the device information indicates to automatically execute the application, the device automatically executes the application corresponding to the device type, the vendor identification information, and the product identification information without confirming the user's command. When the device is the communication device capable of accessing the mobile communication network, the device determines whether to disconnect from the mobile communication network according to whether the mobile communication network connection is supported. For example, when the other device supports the mobile communication network connection, the device can disconnect from the mobile communication network and serve as the input means of the other device. Alternatively, when the other device supports the mobile communication network connection, the device can access the mobile communication network through the other device. For example, the device can be the mobile device and the other device can be the head unit of the vehicle.

In FIG. 6, the device obtains the device information of the other device from the specific field of the received data. Alternatively, the MAC address, rather than the specific field, can be used to obtain the device information. In this example, the device information is defined as the plurality of the profiles, and the device can determine the range of the MAC address of the other device and then determine that one profile corresponding to the range is the device information of the device.

Figure 7:
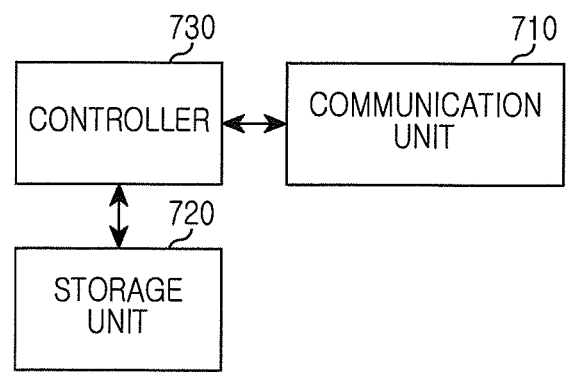
FIG. 7 illustrates an apparatus for the communication between the devices according to an exemplary embodiment of the present disclosure.

FIG. 7 illustrates an apparatus for the communication between the devices according to an exemplary embodiment of the present disclosure.

Referring to FIG. 7, the device includes a communication unit 710, a storage unit 720, and a controller 730.

The communication unit 710 provides an interface for the device to communicate with the other device. For example, the communication unit 710 provides the communication interface conforming to one of the wireless LAN, the USB, and the Bluetooth. That is, the communication unit 710 converts a transmit bit stream to a physical signal according to one of the wireless LAN, the USB, and the Bluetooth, and interprets the received physical signal. When the device is capable of accessing the mobile communication network, the device can further include another communication unit for providing a communication interface for accessing the mobile communication network. The storage unit 720 stores a basic program for operating the device, setup information, and applications.

The controller 730 controls the operations of the device. For example, the controller 730 sets the connection with the other device according to the communication protocol provided from the communication unit 710. In particular, the controller 730 controls to transmit or receive the device information for the communication between the devices. For example, the device information can include at least one of the device type (e.g., wireless LAN AP, head unit, camera, refrigerator, TV, etc.), the support of the mirror link, the mobile communication network connection support, the automatic execution of a particular application, the vendor identification information, and the product identification information.

When the device transmits the device information, the controller 730 operates as follows. The controller 730 sets the value of the specific field of the data to transmit based on the communication protocol used to connect to the other device, to the value indicating the device information. The specific field can be the SSID field of the beacon frame or the probe response frame of the wireless LAN. The specific field can be the data field of the setup packet of the USB. When the specific field is the data field of the setup packet, the purpose field of the setup packet can be set to the value indicating the device information provision. The controller 730 controls the communication unit 710 to transmit the data including the specific field based on the communication protocol used to connect with the other device. For example, when the wireless LAN is used to connect to the other device, the controller 730 transmits the beacon frame or the probe response frame including the device information. When transmitting the probe response frame, the controller 730 can receive the probe request frame from the other device before transmitting the probe response frame. When the USB is used to connect to the other device, the controller 730 transmits the setup packet indicating the device information provision and then transmits the data including the device information.

When the device receives the device information, the controller 730 operates as follows. The controller 730 obtains the device information of the other device using the communication protocol used to connect to the other device. When the wireless LAN is used to connect to the other device, the controller 730 receives the beacon frame or the probe response frame including the device information. As receiving the probe response frame, the controller 730 can transmit the probe request frame to the other device before receiving the probe response frame. When the USB is used to connect to the other device, the controller 730 receives the setup packet indicating the device information provision and then receives the data including the device information. Next, the controller 730 performs the corresponding operation according to the device information. For example, the controller 730 identifies the type of the other device based on the device information. The controller 730 determines the application to execute based on the device type, the vendor identification information, and the product identification information. The controller 730 determines whether to automatically execute the application corresponding to the other device or to wait for the user's command, depending on whether the application is automatically executed. When the device information indicates to automatically execute the application, the controller 730 automatically executes the application corresponding to the device type, the vendor identification information, and the product identification information without confirming the user's command. When the device is the communication device capable of accessing the mobile communication network, the controller 730 determines whether to disconnect from the mobile communication network according to whether the mobile communication network connection is supported. For example, when the other device supports the mobile communication network connection, the controller 730 can disconnect from the mobile communication network and serve as the input means of the other device. Alternatively, when the other device supports the mobile communication network connection, the controller 730 can access the mobile communication network through the other device.

Since the device information is provided in the communication between the devices using the communication protocol, it is possible to determine the characteristic of the other device and to provide the optimized service based on the characteristic.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an operation of a first device for communicating with a second device, the method comprising:
    generating a message including device information of the first device defined by a communication protocol used to connect to the second device; and
    transmitting the message using the communication protocol to the second device in response to receiving a request for the device information from the second device,
    wherein the device information comprises support of a mirror link and support of a mobile communication network connection corresponding to the first device.

2. The method of claim 1, wherein:
the message comprises one of a beacon frame, a probe response frame of a wireless Local Area Network (LAN), and a setup packet of a Universal Serial Bus (USB) and data relating to the setup packet; and
the device information is included in one of a Service Set Identifier (SSID) field and the data.

3. The method of claim 2, wherein:
the setup packet comprises one of a purpose field for specifying contents of a request, and a field set to a value indicating a version of the mirror link; and
the purpose field is set to a value indicating provision of the device information.

4. A method for an operation of a first device for communicating with a second device, the method comprising:
receiving device information of the second device from a message defined by a communication protocol used to connect to the second device in response to transmitting a request for the device information to the second device; and
performing an operation as indicated by the device information,
wherein the device information comprises support of a mirror link and a mobile communication network connection corresponding to the second device.

5. The method of claim 4, wherein:
the message comprises one of a beacon frame, a probe response frame of a wireless Local Area Network (LAN), and a setup packet of a Universal Serial Bus (USB) and data relating to the setup packet; and
the device information is included in one of a Service Set Identifier (SSID) field and the data.

6. The method of claim 5, wherein:
the setup packet comprises one of a purpose field for specifying contents of a request, and a field set to a value indicating a version of the mirror link; and
the purpose field is set to a value indicating provision of the device information.

7. The method of claim 4, wherein performing the operation as indicated by the device information comprises:
after support of the mobile communication network connection is indicated, disconnecting from the mobile communication network, accessing the mobile communication network through the second device, and serving as an input means of the second device.

8. An apparatus of a first device configured to communicate with a second device, the apparatus comprising:
a controller configured to generate device information of the first device defined by a communication protocol used to connect to the second device; and
a communication unit configured to transmit the message using the communication protocol to the second device in response to receiving a request for the device information from the second device,
wherein the device information comprises support of a mirror link and support of a mobile communication network connection corresponding to the first device.

9. The apparatus of claim 8, wherein:
the message comprises one of a beacon frame and a probe response frame of a wireless Local Area Network (LAN); and
the device information is included in a Service Set Identifier (SSID) field.

10. The apparatus of claim 8, wherein:
the message comprises a setup packet of a Universal Serial Bus (USB) and data relating to the setup packet; and
the device information is included in the data.

11. The apparatus of claim 10, wherein:
the setup packet comprises a purpose field for specifying contents of a request; and
the purpose field is set to a value indicating provision of the device information.

12. The apparatus of claim 10, wherein the setup packet comprises a field set to a value indicating a version of the mirror link.

13. An apparatus of a first device configured to communicate with a second device, the apparatus comprising:
a communication unit configured to receive a message defined by a communication protocol used to connect to the second device; and
a controller configured to obtain device information of the second device from the message and perform an operation as indicated by the device information in response to transmitting a request for the device information to the second device,
wherein the device information comprises support of a mirror link and support of a mobile communication network connection corresponding to the second device.

14. The apparatus of claim 13, wherein:
the message comprises one of a beacon frame and a probe response frame of a wireless Local Area Network (LAN); and
the device information is included in a Service Set Identifier (SSID) field.

15. The apparatus of claim 13, wherein:
the message comprises a setup packet of a Universal Serial Bus (USB) and data relating to the setup packet; and
the device information is included in the data.

16. The apparatus of claim 15, wherein:
the setup packet comprises a purpose field for specifying contents of a request; and
the purpose field is set to a value indicating provision of the device information.

17. The apparatus of claim 15, wherein the setup packet comprises a field set to a value indicating a version of the mirror link.

18. The apparatus of claim 13, wherein the device information further comprises automatic execution of an application corresponding to the second device, wherein, after automatic execution of the application is indicated, the controller is configured to execute an application corresponding to the second device without a command of a user.

19. The apparatus of claim 13, wherein, after support of the mobile communication network connection is indicated, the controller is configured to disconnect from the mobile communication network and serve as an input means of the second device.

20. The apparatus of claim 13, wherein, after support of the mobile communication network connection is indicated, the controller is configured to disconnect from the mobile communication network and access the mobile communication network through the second device.

* * * * *